(12) United States Patent
Anderson et al.

(10) Patent No.: US 7,093,888 B2
(45) Date of Patent: Aug. 22, 2006

(54) RETRACTABLE DECK FOR A VEHICLE

(76) Inventors: Anthony R. Anderson, 4033 Belle Ridge Dr., Dryden, MI (US) 48428; Michael S. Warner, 4234 Havens Rd., Dryden, MI (US) 48428

( * ) Notice: Subject to any disclaimer, the term of this patent is extended or adjusted under 35 U.S.C. 154(b) by 0 days.

(21) Appl. No.: 10/887,597

(22) Filed: Jul. 9, 2004

(65) Prior Publication Data
US 2006/0006693 A1    Jan. 12, 2006

(51) Int. Cl.
*B60P 3/37*   (2006.01)

(52) U.S. Cl. .................. 296/162; 296/163; 296/26.12; 52/67

(58) Field of Classification Search ..................... 52/7, 52/64, 67, 126.6
See application file for complete search history.

(56) References Cited

U.S. PATENT DOCUMENTS

| | | | |
|---|---|---|---|
| 3,489,428 A * | 1/1970 | Hunter et al. ............ 280/765.1 |
| 3,741,606 A | 6/1973 | Grier | |
| 3,796,456 A | 3/1974 | Bergeson et al. | |
| 4,869,030 A * | 9/1989 | Clark .......................... 52/79.6 |
| 4,874,197 A * | 10/1989 | Grable ........................ 296/162 |
| 4,962,709 A | 10/1990 | Huber | |
| 5,193,878 A | 3/1993 | Weaver | |
| 5,295,430 A * | 3/1994 | Dewald et al. ........... 92/165 R |
| 5,417,468 A | 5/1995 | Baumgartner et al. | |
| 5,653,459 A * | 8/1997 | Murphy ....................... 280/166 |
| 5,784,837 A | 7/1998 | Klein et al. | |
| 5,822,930 A | 10/1998 | Klein | |
| 5,876,051 A * | 3/1999 | Sage, Sr. ..................... 280/166 |
| 5,902,001 A * | 5/1999 | Schneider ................. 296/26.13 |
| 5,997,073 A * | 12/1999 | Vanderhoof .................. 296/162 |
| 6,736,446 B1 * | 5/2004 | Johnson ...................... 296/162 |
| 6,869,092 B1 * | 3/2005 | Henn .......................... 280/166 |
| 2003/0099532 A1 | 5/2003 | Williams | |

OTHER PUBLICATIONS

King of the Road, 2003 Royalite.

* cited by examiner

*Primary Examiner*—D. Glenn Dayoan
*Assistant Examiner*—Greg Blankenship
(74) *Attorney, Agent, or Firm*—Gifford, Krass, Groh, Sprinkle, Anderson & Citkowski, P.C.

(57) ABSTRACT

A deck for use with a vehicle having a frame includes a platform. The platform has opposite upper and lower surfaces. The platform is operatively coupled to the frame of the vehicle for selective movement between a storage position, wherein the upper surface is disposed substantially underneath the vehicle and a use position wherein the upper surface is disposed alongside the vehicle for ingress and egress thereon. A stabilizer extends from the lower surface for supporting the platform above the ground while in the use position. The stabilizer is selectively height adjustable to maintain the upper surface in a generally horizontal position.

24 Claims, 11 Drawing Sheets

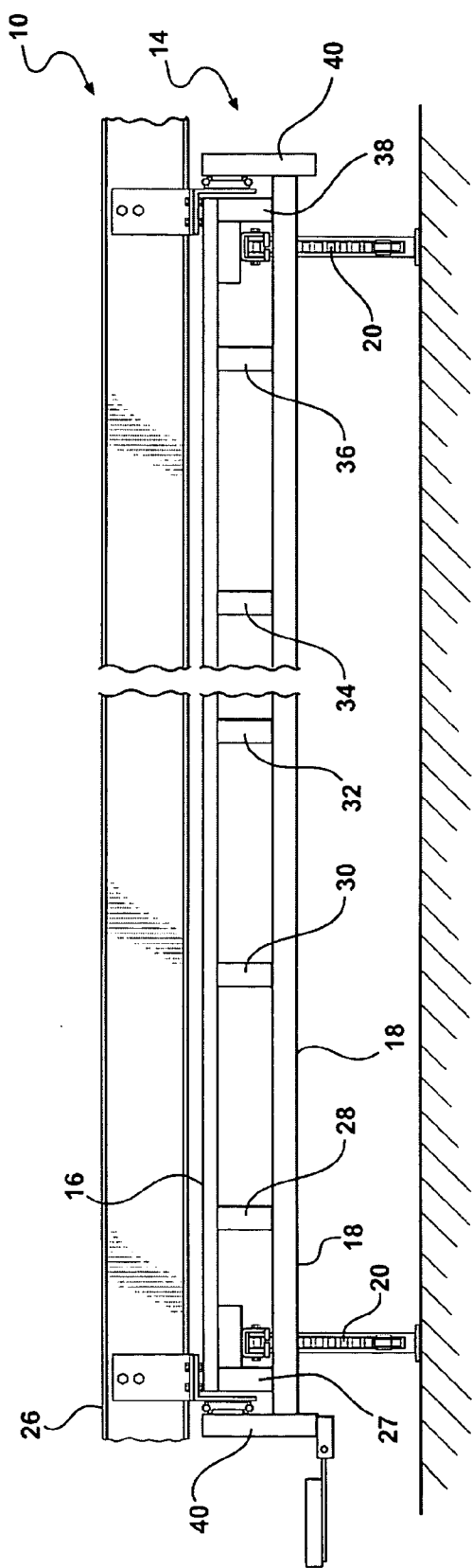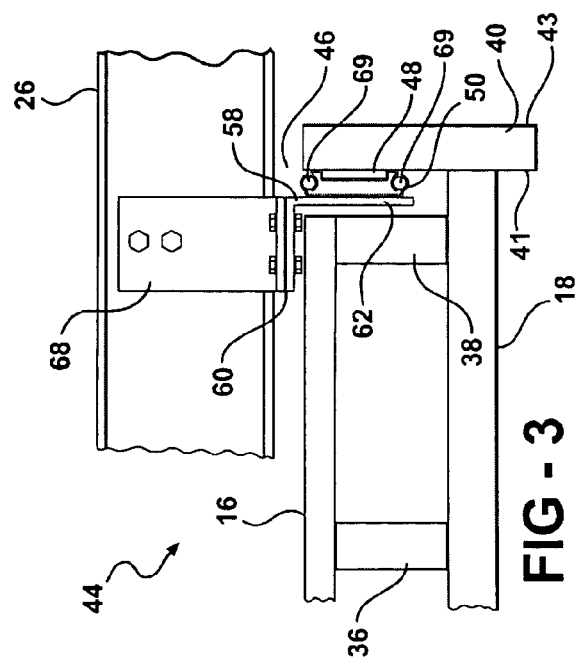

RETRACTABLE DECK FOR A VEHICLE

FIELD OF THE INVENTION

The present invention generally relates to decks, and in particular retractable decks suitable for mounting on a vehicle.

BACKGROUND OF THE INVENTION

The rushed pace and hectic schedule-balancing inherent in today's modern culture has made long getaways a rare luxury. In lieu of long vacations, many are opting for shorter, extended-weekend trips. Because time is precious on these quick trips, many find it undesirable to spend large amounts of time at airports where all passengers are subject to lengthy safety precautions and where flights can be delayed or cancelled. Instead, many choose to drive to a suitable location with a recreational vehicle and camp.

Modern recreational vehicles are equipped with all the technological comforts available in one's home, such as microwaves, DVD players and satellite television. Yet despite all of these internal comforts, most recreational vehicles lack exterior comforts that enhance the user's ability to enjoy the outdoors. Traditionally, if a recreational vehicle user wanted to have a picnic, grill or sunbathe by his vehicle, he would simply do so on the ground or perhaps lay a carpet or a blanket on the ground to enhance comfort. However, the ground is often not level and in the case of inclement weather, the ground and the carpet may get wet or muddy. A more ideal way to enjoy the outdoors would be for the recreational vehicle to have a deck.

A recreational vehicle having a platform is disclosed in U.S. Pat. No. 5,193,878 issued to Weaver. Weaver discloses a vehicle having a platform stowable in a storage bay mounted underneath the vehicle. The storage bay includes rollers to reduce friction when the platform is pulled out and when it is stowed. To further support the platform, a cable guide system including a cable and a pulley is employed. When the platform is in use, it lies directly on the ground. However, the added weight and space of a storage bay can negatively impact the cost of the system as well as the gas mileage of the vehicle. In addition, such a storage bay would likely require dismantling in the event that the vehicle requires repairs. Furthermore, it may be undesirable to have the platform resting directly on the ground in inclement weather or if the user desires to prevent the destruction of plants or grasses.

U.S. Pat. No. 5,784,837 issued to Klein et al discloses a collapsible deck for use with either a recreational vehicle or a mobile home. The collapsible deck includes a platform that is mounted on a frame assembly. The frame assembly includes a frame, a hitch and an axle having at least two tires. The platform has four sides that, when not in use, fold upwards to create a box having five walls. When in use, the four sides fold downward to form a skirt underneath the platform. When being transported, the four sides of the platform are folded upwards and the hitch is connected to a suitable towing mechanism on a vehicle. However, the requirement that the deck be hitched to a vehicle may be inconvenient if the user desired to hitch other equipment, such as an automobile, jet ski, or a snowmobile to the vehicle.

Consequently, there is a need in the art for a device adapted to minimize or eliminate one or more of the shortcomings set forth above.

SUMMARY OF THE INVENTION

According to one aspect of the invention, a deck for use with a vehicle having a frame. The deck includes a platform having opposite upper and lower surfaces. The platform is operatively coupled to the frame of the vehicle for selective movement between a storage position, wherein the upper surface is disposed substantially underneath the vehicle and a use position wherein the upper surface is disposed alongside the vehicle for ingress and egress thereon. A stabilizer extends from the lower surface for supporting the platform above the ground while in the use position. The stabilizer is selectively height adjustable to maintain the upper surface in a generally horizontal position.

BRIEF DESCRIPTION OF THE DRAWINGS

The present invention will now be described by way of example, with reference to the accompanying drawings, in which:

FIG. 2 depicts a cross-sectional view of the platform in accordance with one embodiment of the invention;

FIG. 3 illustrates a cross-sectional view of the attachment assembly in accordance with one embodiment of the invention;

DETAILED DESCRIPTION OF THE PREFERRED EMBODIMENTS

Figure 1:
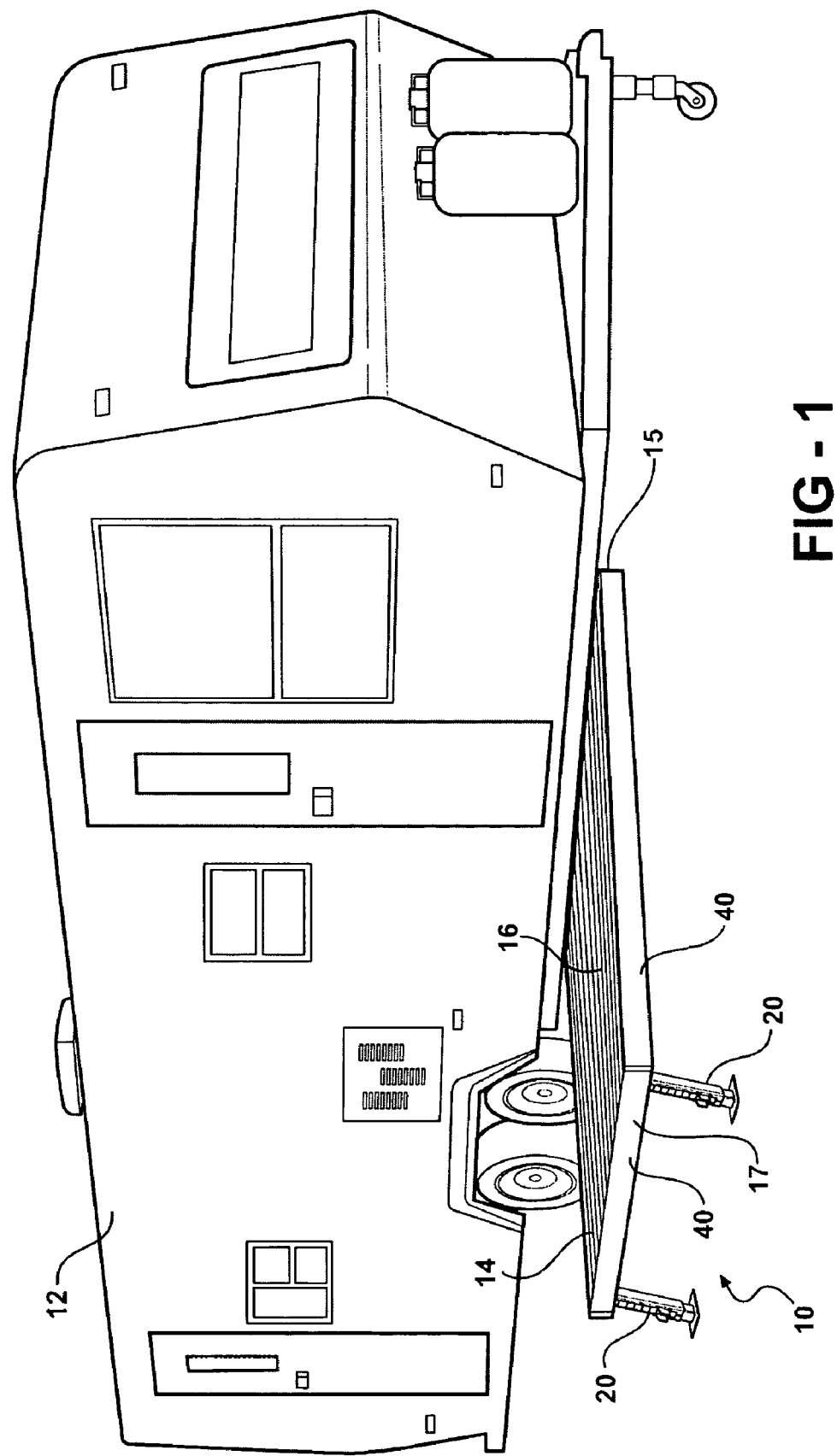
FIG. 1 illustrates a perspective view of the deck in accordance with one embodiment of the invention.

Referring to the figures wherein like reference numerals are used to identify like components throughout the various views, a deck according to an embodiment of the invention is generally indicated at 10. Described in greater detail below, the deck 10 is operatively coupled to a bottom side of the vehicle 12 for selective sliding movement between a storage position disposed along the bottom side of the vehicle 12, a use position extending transversely outwardly from a side of the vehicle 12, as best shown in FIG. 1, and any of a plurality of intermediate positions therebetween. Preferably, the deck 10 is used with a recreational vehicle 12, but may be used with other vehicles, such as motor homes, trucks, cars, fifth wheels, farm equipment, military vehicles and the like.

Referring to FIGS. 1 through 4, the deck 10 includes a platform 14 having opposite proximal 15 and distal 17 ends. The platform 14 includes spaced apart upper 16 and lower 18 surfaces extending transversely between the proximal 15 and distal 17 ends. The platform 14 also includes a plurality of braces 27, 28, 30, 32, 34, 36, 38. It should be appreciated that the number of braces required is dependent upon engineering and design considerations and is not intended to be limiting. Each brace 27, 28, 30, 32, 34, 36, 38 extends between the upper 16 and lower 18 surfaces to provide support, strength and stability for the deck 10. The upper 16 and lower 18 surfaces may be affixed to the braces 27, 28, 30, 32, 34, 36, 38 by any suitable fastener, such as screws or nails, by any suitable fixing method, such as welding, adhesives or clamps, or by any combinations thereof. Although the braces 27, 28, 30, 32, 34, 36, 38 are illustrated as disposed between the upper surface 16 and the lower surface 18, the braces 27, 28, 30, 32, 34, 36, 38 may be located where design and engineering requirements warrant. Outer side members 40 are fixedly secured along opposite sides of the platform 14. Each of the side members 40 includes opposite inner 41 and outer 43 sides.

Figure 7:
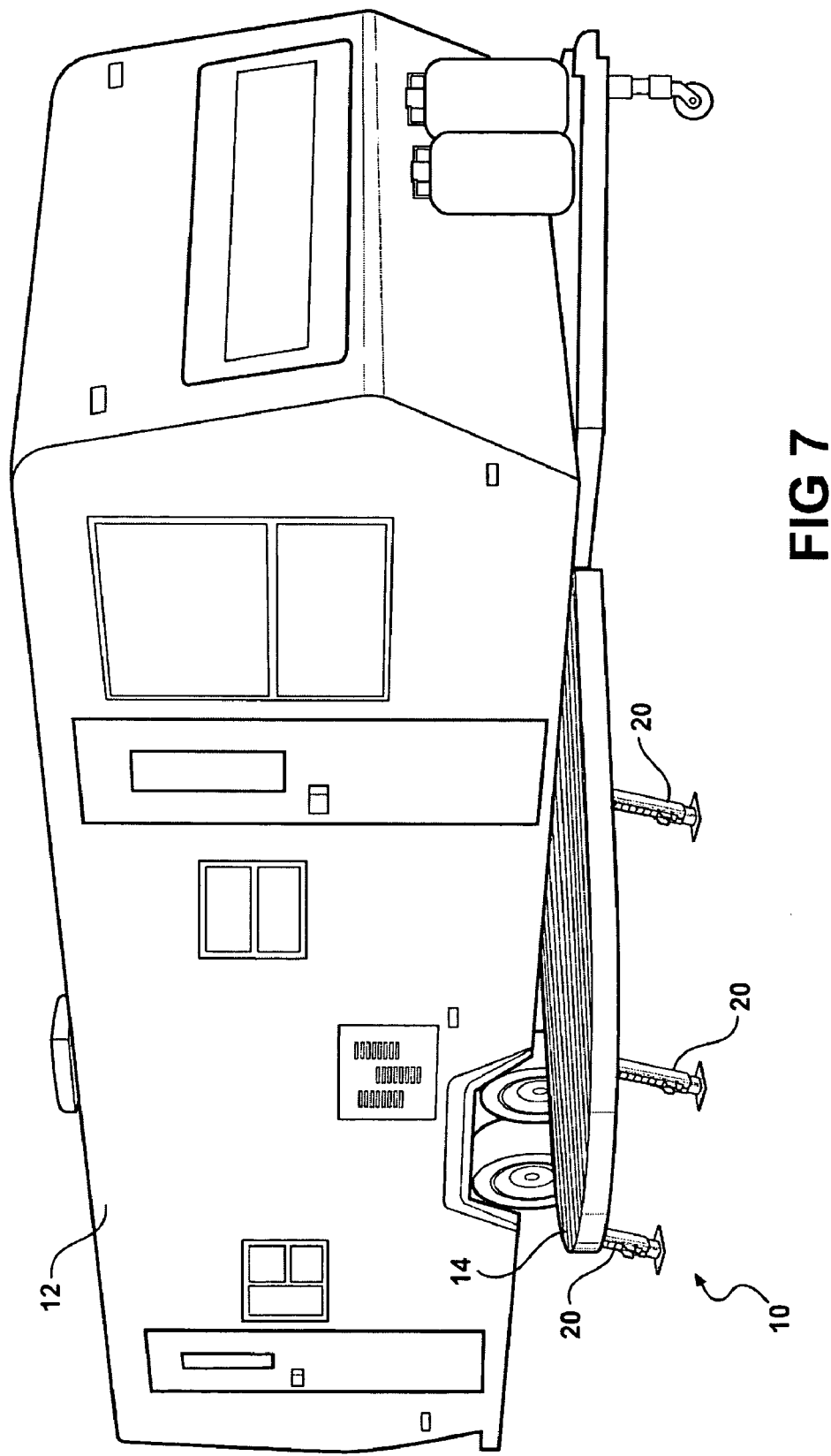
FIG. 7 is a perspective view of the deck in accordance with a second embodiment of the invention.

The platform 14 can be made of wood, metal, plastic, composite materials known in the art, or any other suitable material. In addition, the platform 14 is not limited in shape to include only quadrilateral configurations, as demonstrated by a second embodiment of the platform 14 in FIGS. 7 and by a third embodiment of the platform 14 in FIG. 8. Preferably, the braces 27, 28, 30, 32, 34, 36, 38 and side members 40, 42 are formed from the same potential materials as the platform 14.

Figure 4:
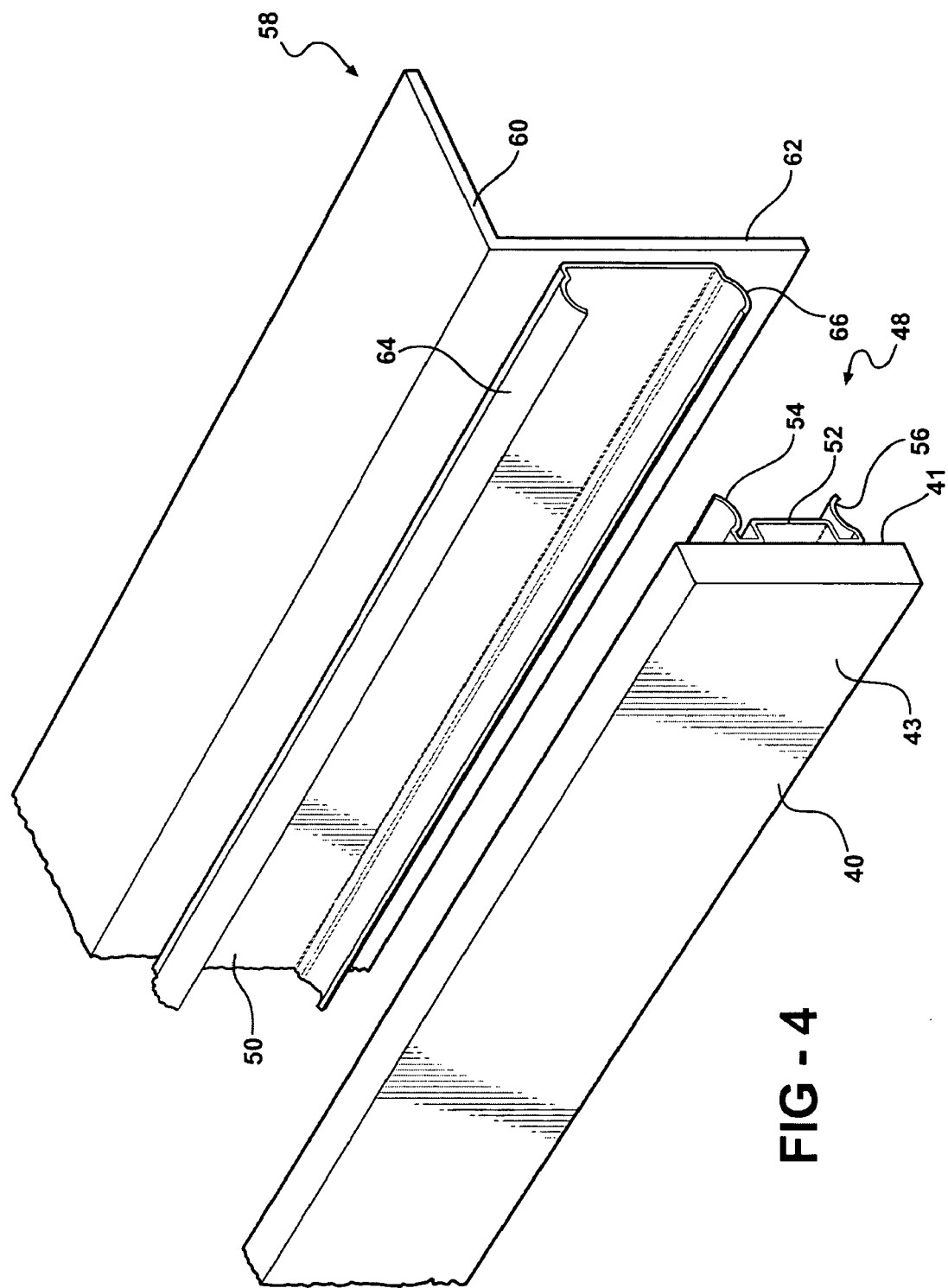
FIG. 4 is an exploded view of the attachment assembly in accordance with one embodiment of the invention.

Referring now to FIGS. 3 and 4, the deck 10 further includes an attachment assembly 44 operatively interconnecting the platform 14 to a rigid member or frame 26 of the vehicle 12. The attachment assembly 44 includes a slider assembly 46. An exemplary slider assembly is Heavy Duty Slide Model 3320 provided by Austin Hardware & Supply, Inc. The slider assembly 46 includes a track 48 and a channel 50. The track 48 is mounted on the outer side members 40 by screws, nails, and equivalent fasteners, by welding, by adhesives, by clamps or by other equivalent means or combinations thereof. The track 48 extends axially along the outer side member 40 of the platform 14. The track 48 includes a base 52, an upper flange 54 and a lower flange 56. The upper 54 and lower 56 flanges are spaced apart and project generally orthogonally from opposite sides of the base 52. The attachment assembly 44 further includes an axially extending bracket 58. The bracket 58 includes an upper face 60 and a lower face 62. The upper face 60 is generally orthogonal relative to the lower face 62. Other angles, however, may be used as dictated by design and engineering considerations. The channel 50 is mounted on the lower face 62 of the bracket 58 by screws, nails, and equivalent fasteners, by welding, by adhesives, by clamps or by other equivalent means or combinations thereof. The channel 50 includes an axially extending upper slot 64 and an axially extending lower slot 66. The upper slot 64 is configured to slidably couple with the upper flange 54 of the track 48. The lower slot 66 is configured to slidably couple with the lower flange 56 of the track 48. Preferably, a plurality of bearings 69 are rollingly supported between the slots 64, 66 and flanges 54, 56 to minimize friction during movement of the platform 14 between the use and storage positions.

The slide assembly 46 is preferably disposed along the inner side 41 of each outer side member 40. By this arrangement, each slide assembly 46 is hidden from view and protected by each outer side member 40. It should be appreciated that each slide assembly 46 can also be secured along the outer side 43 of each outer side member 40

Figure 5B:
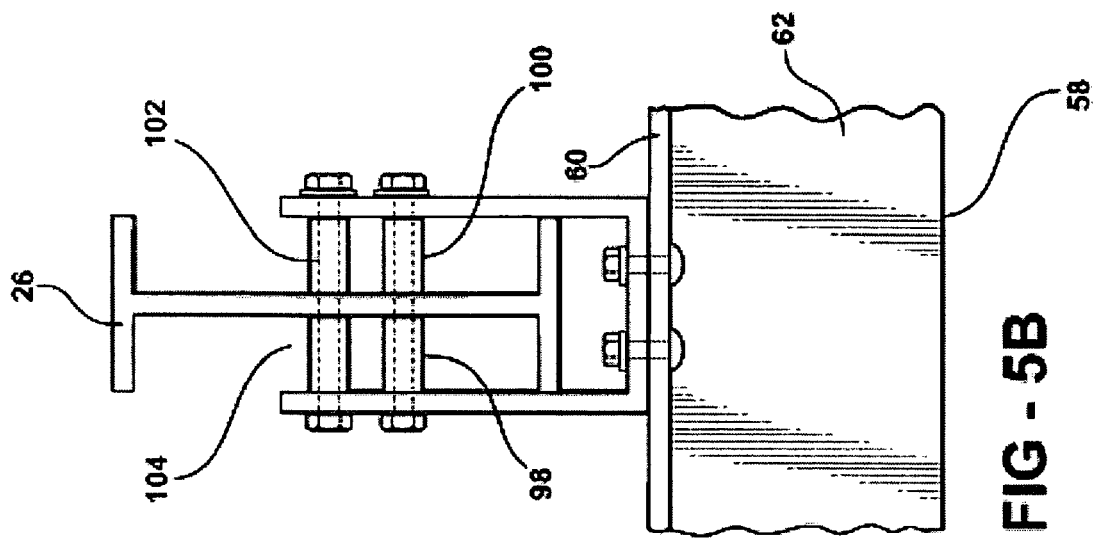
FIG. 5 is a profile view of the mounting strap in accordance with one embodiment of the invention.
Figure 5A:
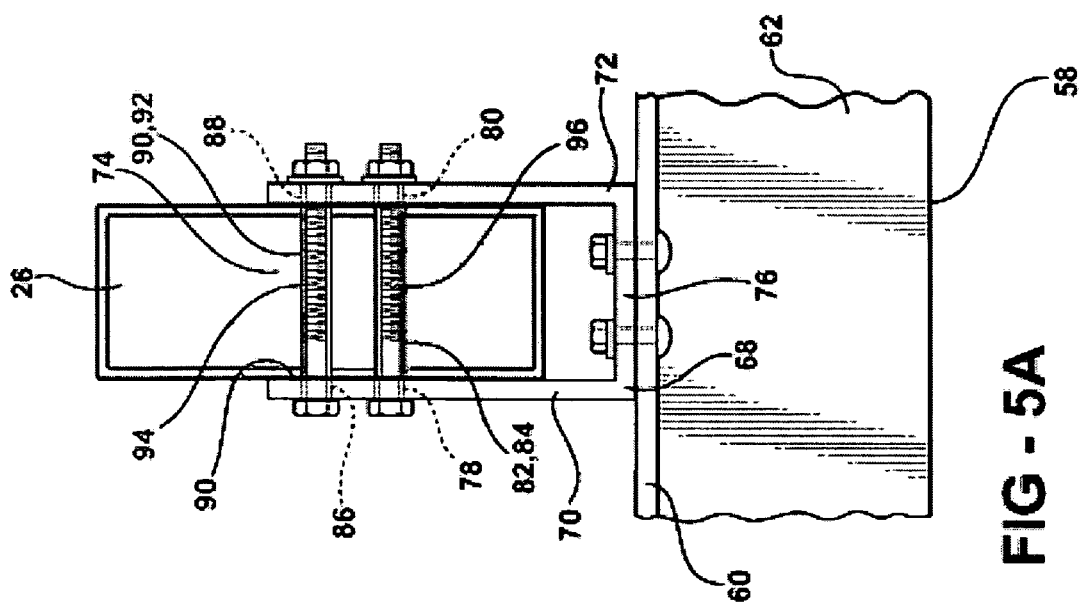

The attachment assembly 44 further includes a mounting strap 68, as shown in FIG. 5a. The mounting strap 68 includes a front flange 70, a rear flange 72 and an end 76. The front 70 and rear 72 flanges are spaced apart to define a slot 74 therebetween. The end 76 extends between the front 70 and rear 72 flanges. The upper face 60 of the bracket 58 is fixedly secured to the end 76, thereby interconnecting the platform 14 and the mounting strap 68. The bracket 58 may be attached to the end 76 by screws, nails, and equivalent fasteners, by welding, by adhesives, by clamps or by other equivalent means or combinations thereof. The mounting strap 68 is secured to the vehicle frame 26 by inserting the frame 26 into the slot 74 of the mounting strap 68 until bores 78, 80 are aligned with bores 82, 84 respectively, and bores 86, 88 are aligned with bores 90, 92 respectively. Once the bores are aligned, the mounting strap 26 can be secured to the frame 26 using bolts 94, 96 or equivalent fasteners. In the event that the vehicle frame 26 is constructed in an I-beam configuration, as shown in FIG. 5b, it will be necessary to use mounting strap spacers 98, 100, 102, 104 to properly secure the mounting strap 68 to the frame 26.

It should be understood that the use of a slider assembly is not intended to be limiting. Other means to operatively interconnect the deck 10 to the vehicle frame 26 include the use of a telescoping rod assembly, a pivot-mount assembly, and the equivalent. It is also to be understood that multiple attachment assemblies may be necessary to properly implement the inventive deck.

Figure 6:
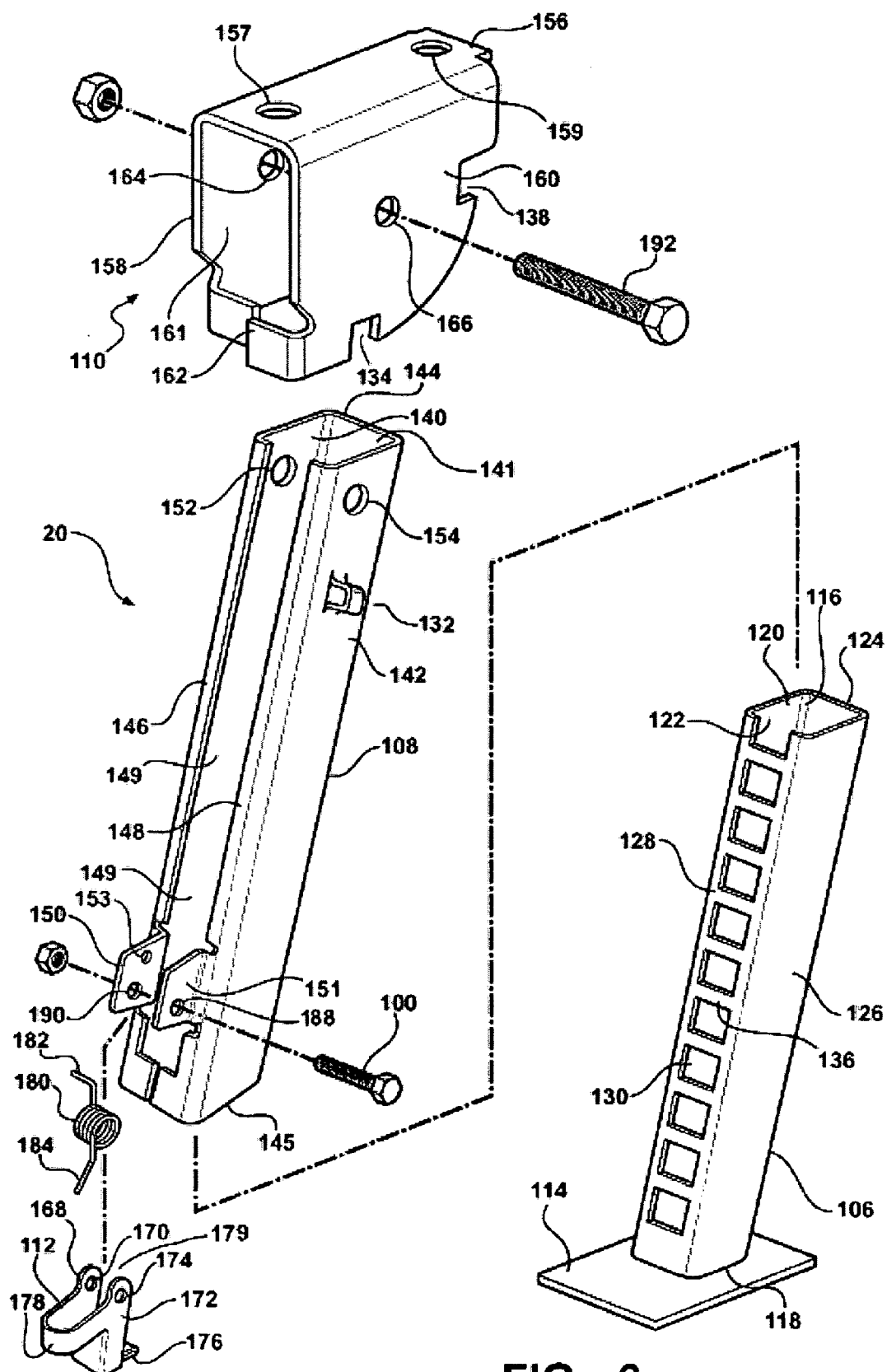
FIG. 6 is an exploded view of a stabilizer in accordance with one embodiment of the invention.

Referring to FIG. 6, the deck 10 includes at least one extendable leg or stabilizer 20 for supporting the distal end 17 of the platform 14 while in the use or intermediate positions. An exemplary stabilizer is the Fulton/Wesbar Camper Stabilizer Part No. 77, provided by Fulton Performance Tools. It is to be understood that multiple stabilizers may be necessary to properly implement the inventive deck 10. The stabilizer 20 includes a first telescoping member 106, a second telescoping member 108, an endpiece 110, and a latch 112.

The first telescoping member 106 includes a cavity 116 having a generally rectangular cross section defined by walls 122, 124, 126, 128. The first telescoping member 106 extends longitudinally between a lower end 118 and an upper end 120. A base 114 is fixedly secured to the lower end 118 of the first telescoping member 106 by any suitable methods, such as welding or bolting, such that the lower end 118 is closed and the upper end 120 remains open. A plurality of windows or apertures 130 are formed in and disposed longitudinally along one of the walls, hereafter referred to as the latticed wall 122. Retainers 136 are defined by the land between adjacent apertures 130. The number of bores and retainers can vary, depending upon design and engineering requirements.

The second telescoping member 108 includes a central bore 141 having a generally rectangular cross section defined by side walls 140, 142, a back wall 144 and left 146 and right 148 flanges. The left 146 and right 148 flanges are opposing and spaced apart. A generally longitudinal slot 149 is defined between the left 146 and right 148 flanges. The second telescoping member 108 includes at least one open end 145. Left 150 and right 151 latch mounts protrude outwardly from respective left 146 and right 148 flanges. At least one of the mounts, the left latch mount 150, includes an anchor 153. A bore 188, 190 is formed in each of the left 150 and right 151 latch mounts. The bores 188, 190 are coaxially aligned. A bore 152, 154 is formed in each of the side walls 140, 142. The bores 152, 154 are coaxially aligned.

The endpiece 110 includes spaced apart left 158 and right 160 flanges. A gap 161 is defined between the left 158 and right 160 flanges. A base 156 extends between the left 158 and right 160 flanges. Bores 157, 159 are formed in the base 156 to allow attachment of the endpiece 110 to the platform 14. A tab or stop 162 extends inwardly toward the gap 161 from an edge of at least one of the flanges 160. A bore 164, 166 is formed in each of the left 158 and right 160 flanges. The bores 164, 166 are coaxially aligned.

The latch 112 includes a lip 176 and a lever 178. Also, the latch 112 is pivotally coupled to the left 150 and right 151 latch mounts. More specifically, the latch includes a left face 168 having a bore 170 and a right face 172 having a bore 174. A cavity 179 is defined between the left 168 and right 172 faces. A biasing member 180 is disposed within the cavity 179. Preferably, the biasing member 180 is a clock spring having a plurality of coils extending helically between first 182 and second 184 ends. In assembly, the bores 188, 190 of the latch mounts 150, 151 are aligned with the bores 170, 174 of the latch 112. A bolt 100, or similar fastener, extends through the bores 170, 174, 188, 190 and through the helical coils of the biasing member 180. The first end 184 of the biasing member 180 is attached to the latch 112 and the second end 182 of the biasing member 180 is attached to the anchor 153 of the left latch mount 150. By this arrangement, the biasing member 180 is continuously energized between the latch 112 and the second telescoping member 108, such that the lip 176 of the latch 112 is continuously biased toward locking engagement with the apertures 130 in the lattice wall 122 of the first telescoping member 108. The lip 176 of the latch 112 can be disengaged from the apertures 130 by actuating the lever 178 overcoming the force applied by the biasing member 180, to the point where the lip 176 has been substantially removed from the apertures 130. Once the lip 176 is disengaged from the apertures 130, the position of the first telescoping member 106 relative to the second telescoping member 108 can be adjusted by sliding it within the central bore 141 of the second telescoping member 108. Once the first telescoping member 106 is adjusted to a desired position, the lip 176 is allowed to lockingly re-engage the aperture 130 corresponding to the desired position. The spring-bias provided by the biasing member 180 maintains the lip 176 in locking engagement with the selected aperture 130.

Still in reference to FIG. 6, the endpiece 110 is attached to the platform 14 by inserting fasteners, such as screws, nails, bolts or the equivalent through bores 157, 159. Of course, the endpiece 110 can be attached to the platform 14 by numerous methods, such as welding or clamping. The endpiece 110 is also attached to the second telescoping member 108. This attachment is accomplished by aligning bores 164, 166 of the endpiece 110 with the bores 152, 154 of the second telescoping member 108. Once the bores are properly aligned, a fastener 192 is fed through the bores 152, 154, 164, 166 to secure the endpiece 110 to the second telescoping member 108. The endpiece 110 is attached to the second telescoping member 108 in a manner that allows the second telescoping member 108 to rotate about the fastener 192 for selective movement between a support position for supporting the deck 10 and a storage position disposed along the underside of the deck 10. The stop 162 on the endpiece 110 prevents over-rotation of the second telescoping member 108 relative to the deck 10. Further, the endpiece 110 includes lower 134 and upper 138 slots defining the support and storage positions, respectively. More specifically, the second telescoping member 108 includes a latch 132 that is selectively engagable with the lower 134 and upper 138 slots to lock the second telescoping member 108 in the support and storage positions.

Figure 8:
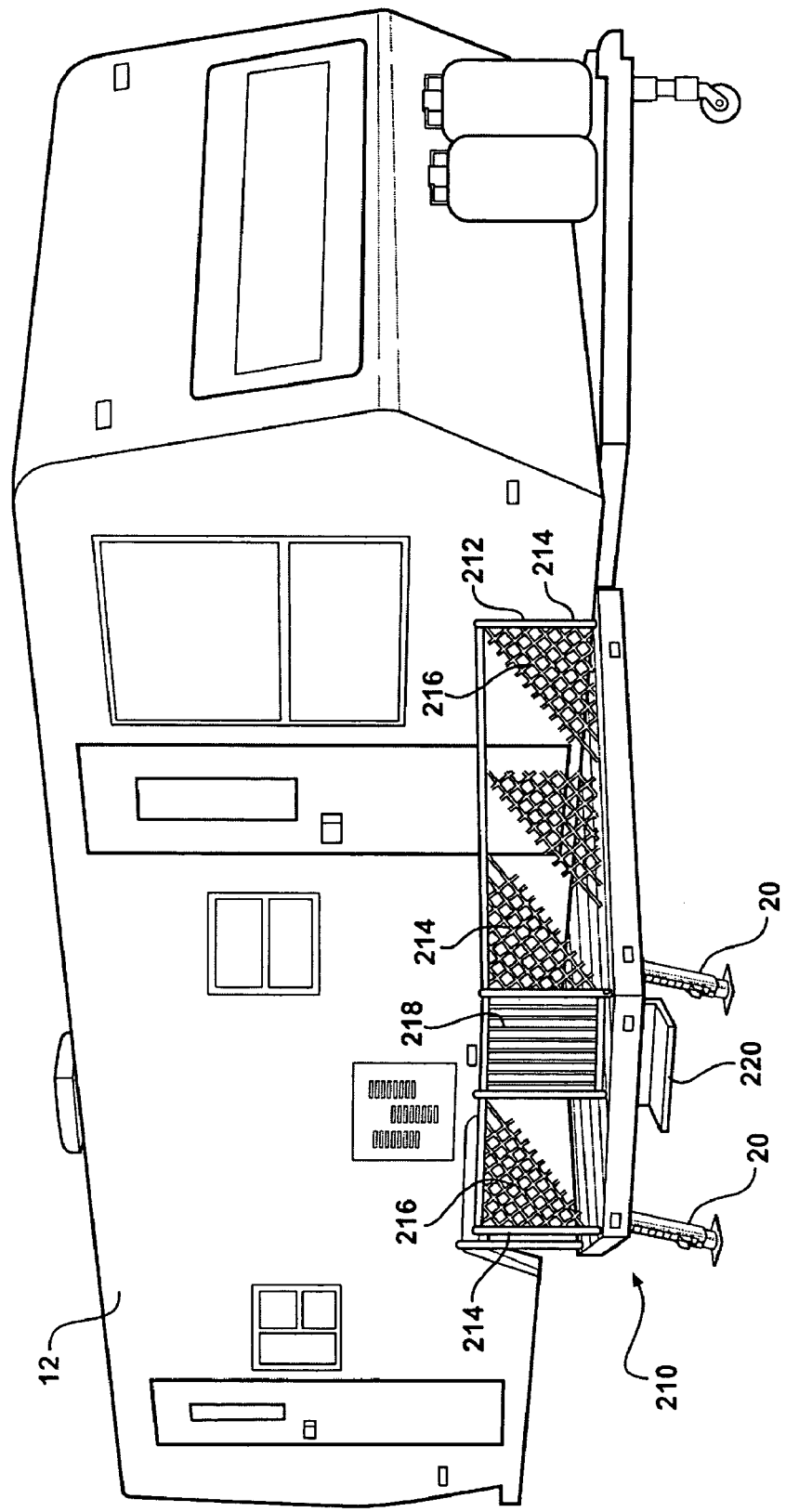
FIG. 8 is a perspective view of the deck in accordance with a third embodiment of the invention.
Figure 9:
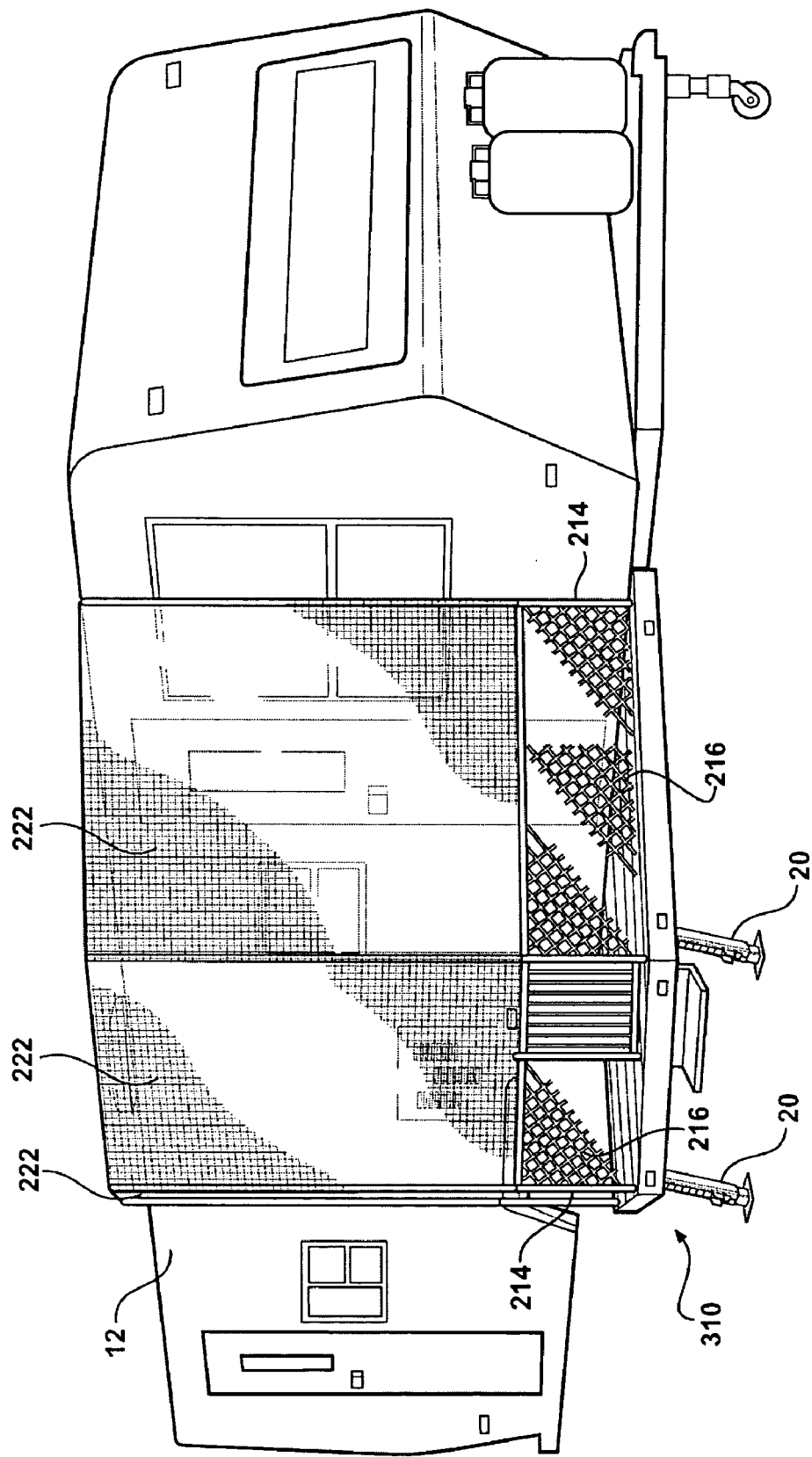
FIG. 9 is a perspective view of the deck in accordance with a fourth embodiment of the invention.
Figure 10:
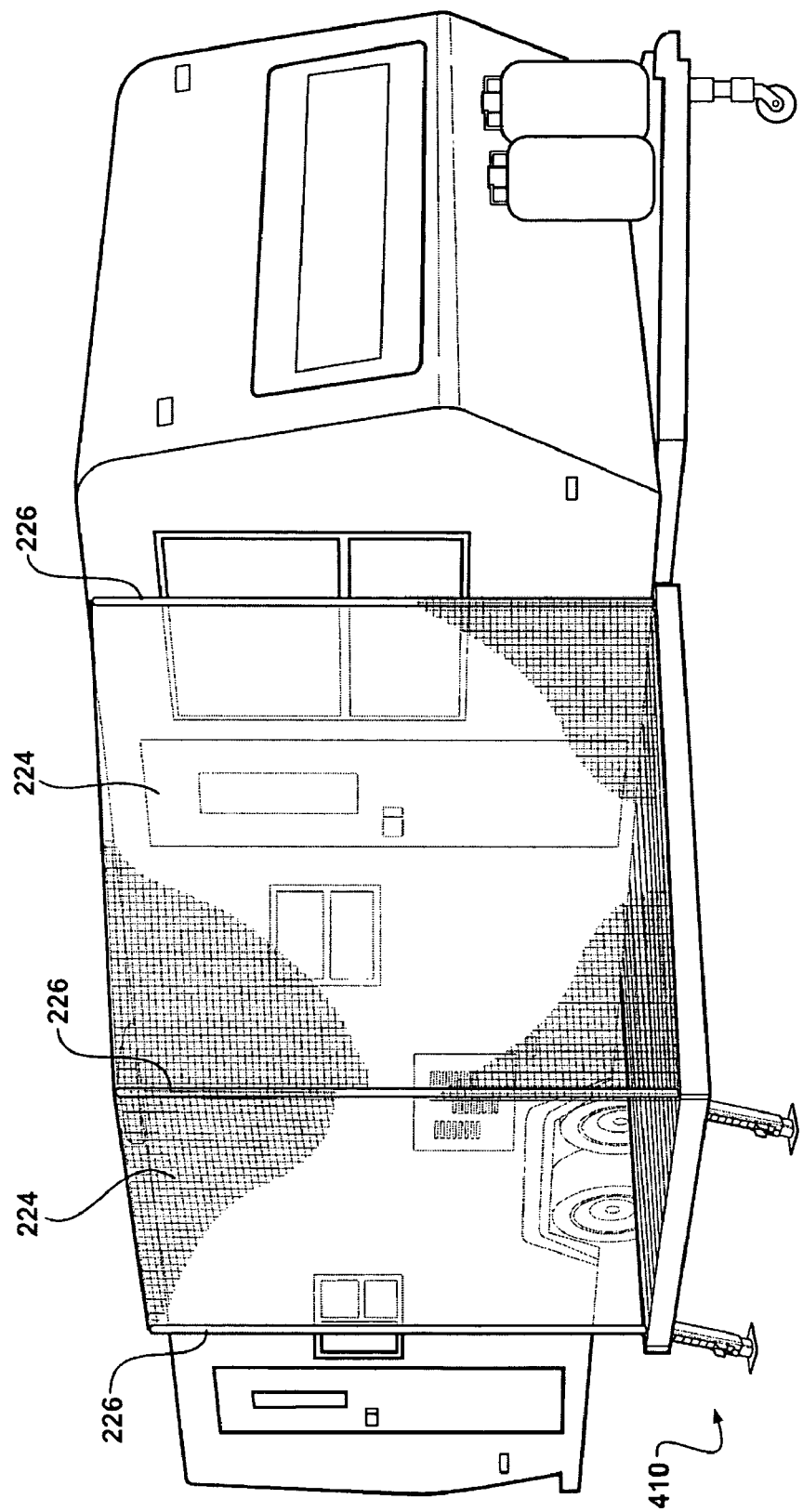
FIG. 10 is a perspective view of the deck in accordance with a fifth embodiment of the invention.
Figure 11:
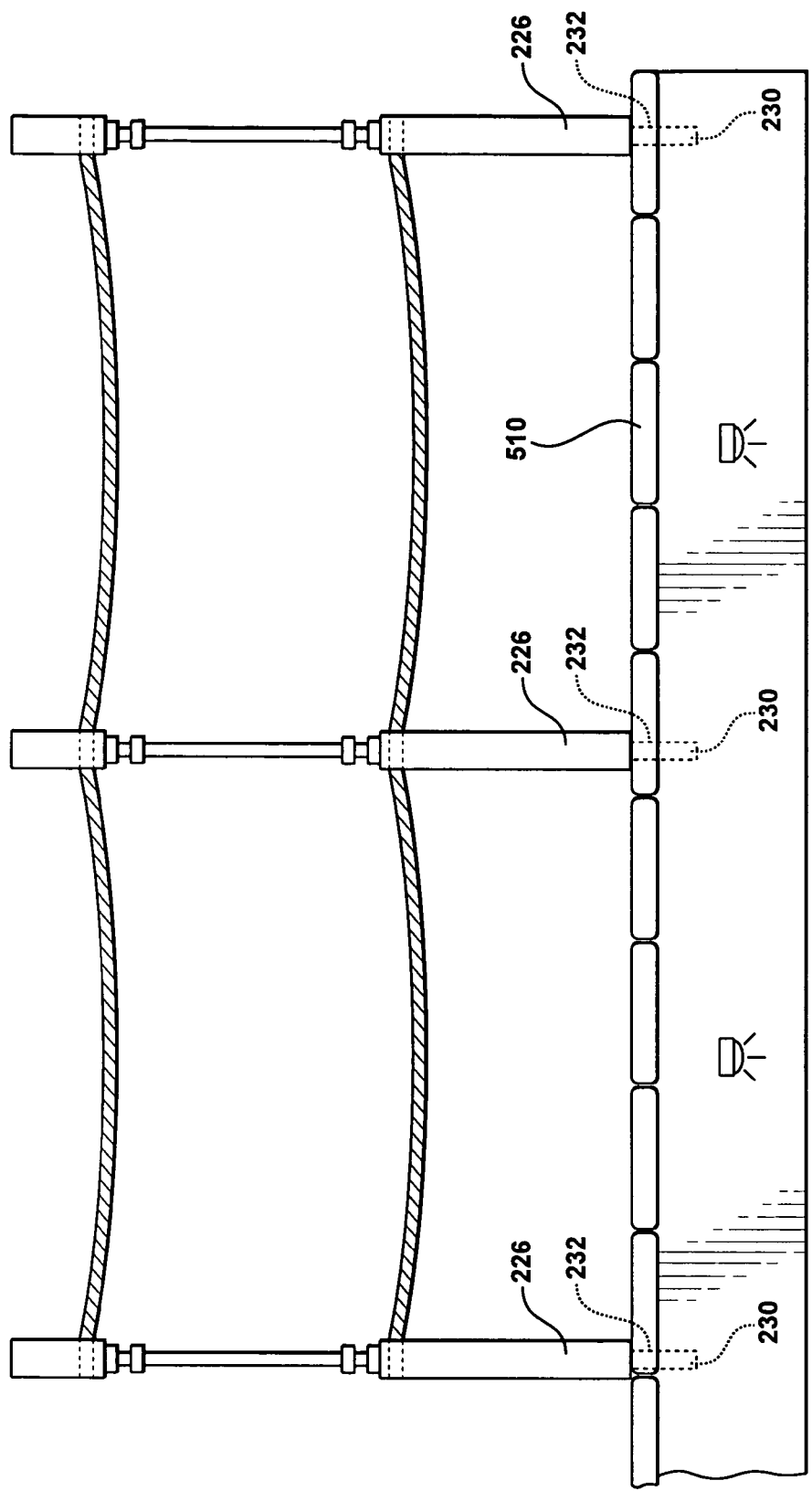
FIG. 11 is a side elevational view of the deck in accordance with a sixth embodiment of the invention.

Referring now to FIG. 8, a third embodiment of the deck 210 is illustrated. A fence 212 is disposed along the peripheral edge of the upper surface 16 of the platform 14. More specifically, the fence 212 includes a plurality of generally upright and spaced apart posts 214 projecting upwardly from the platform 14. A wall 216 extends between each pair of adjacent posts 214 to prevent ingress and egress therethrough, so that the fence 212 defines a generally enclosed area on the upper surface 16. An opening 218 is formed in the fence 212 to allow ingress onto and egress from the upper surface 16 of the platform 14. A step 220 is fixedly secured to an edge of the platform 14 to facilitate ingress and egress through the opening 218. Preferably, the step 220 is selectively collapsible for storage when not in use. In FIG. 9, a fourth embodiment of the deck 310 is illustrated, wherein the fence 212 includes a generally upright, extended screen 222 disposed along the top of each wall 216. Referring to FIG. 10, a fifth embodiment of the deck 410 is illustrated, wherein a plurality of screens 224 are disposed along the peripheral edge of the upper surface 16. A plurality of upright and spaced apart posts 226 project upwardly from the platform 14 for supporting the screens 224. Referring to FIG. 11, a sixth embodiment of the deck 510 is shown, wherein at least one rope 228 extends between adjacent posts 226 to prevent ingress and egress through the opening 518.

As best shown in FIG. 11, a rod 230 is fixedly secured to and extends axially from the bottom of each post 226. Preferably, each rod 230 extends through a corresponding bore or aperture 232 formed in the deck 510 to support the rod 230 in a generally upright position relative to the platform. The rods 230 are removable from the apertures 232 to allow unhindered movement of the platform between the storage and use positions. The rods 230 can be threaded to allow a retaining nut to be secured to the end thereof for fixedly securing the post 226 to the platform.

Figure 12:
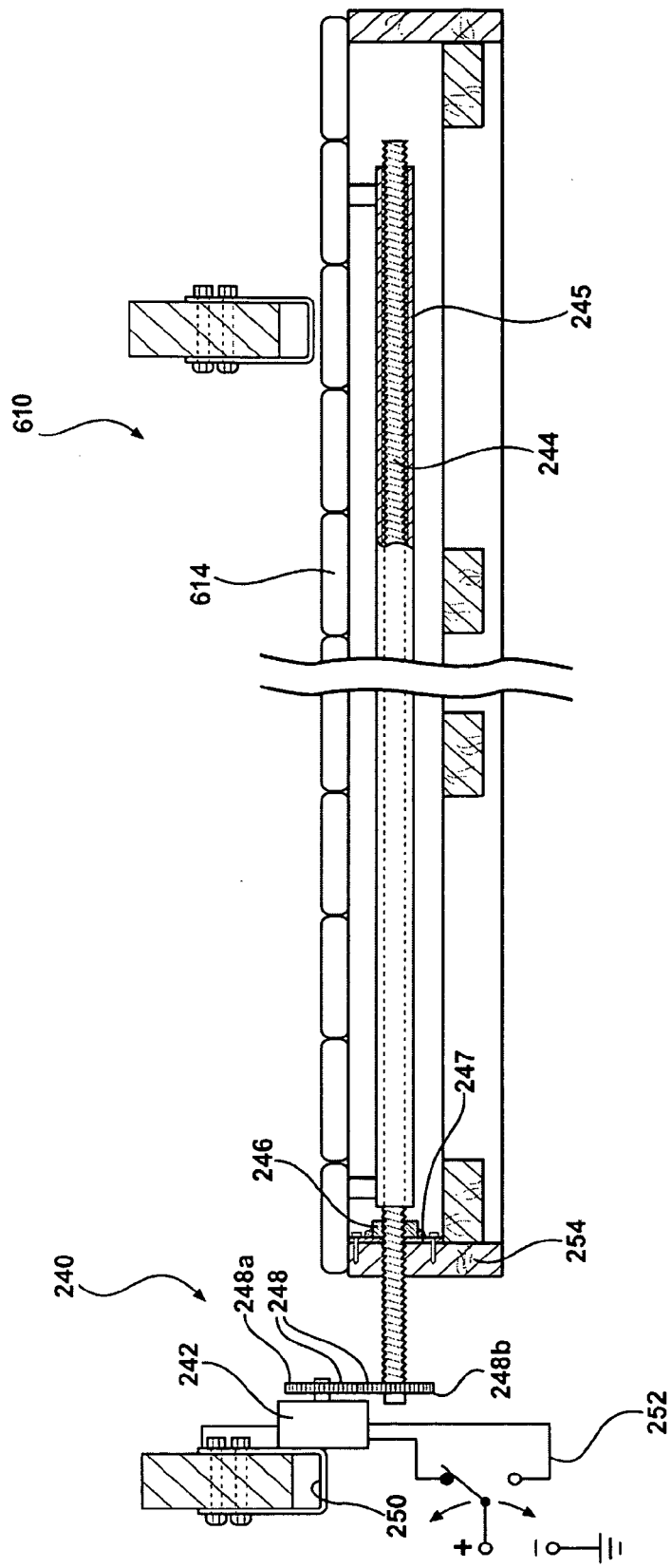
FIG. 12 is a side elevational view of the deck according to a seventh embodiment of the invention.

In FIG. 12, a seventh embodiment of the deck 610 is shown, which includes a drive assembly 240 operatively coupled between the vehicle and the deck 610 for automatically moving the platform 614 between the storage and use positions. Preferably, the drive assembly 240 is in the form of a threaded positioner mechanism. More specifically, the drive assembly 240 includes a reversible motor 242, threaded rod 244, a threaded nut 246, a toggle switch 252, a gear reduction or sprocket assembly 248, and a motor mounting bracket 250. The motor mounting bracket 250 is fixedly secured to the frame of the vehicle and protrudes downwardly therefrom. The motor 242 is fixedly secured to the mounting bracket 250 by suitable fasteners, such as bolts. A first sprocket 248a is fixedly secured to a driven shaft of the motor 242. A second sprocket 248b is fixedly secured to an end of the threaded rod 244. Preferably, the sprockets 248 are held in place using set screws. The sprockets 248 are engaged so that the threaded rod 244 is rotatably driven by the motor 242. The threaded nut 246 is fixedly secured to a flange 247, which, in turn, is fixedly secured to the side member 40 by any suitable fixing methods, such as by a bolt or screw. The threaded rod 244 is rotatably supported by a hole 254 formed in the side member 40 and also by a longitudinal sleeve 245 that is fixedly secured to the platform 614.

Further, the threaded rod 244 remains threadingly engaged with the nut 246, such the platform 614 is displaced between the storage and use positions in response to corresponding rotation of the threaded rod 246. Preferably, a bearing assembly is coupled between the threaded rod 244 and the frame of the vehicle to minimize friction.

The motor 242 is operatively coupled with the vehicle's electrical system. The toggle switch 252 is coupled between the motor 242 and the electrical system to allow selective actuation of the motor in either of its drive directions to effect movement of the platform 614 between of the storage and use positions. The switch 252 can be mounted anywhere in the vehicle, but preferably at a place that provides the operator a view of the platform 614 as it moves between the storage and use positions. Preferably, a twenty amp circuit breaker is coupled in the circuit driving the motor 242. The breaker prevents overloading of the motor 242, which may occur, for example, when the platform 614 encounters an obstacle such as a tree or another vehicle.

While the invention has been particularly shown and described with reference to the preferred embodiment thereof, it is well known by those skilled in the art that various changes and modifications can be made in the invention without departing from the spirit and scope of the invention as defined by the following claims.

What is claimed is:

1. A deck for use with a vehicle having a frame, the deck comprising:
   a platform having an upper surface;
   a stabilizer extending downwardly from the platform for supporting the platform above the ground while in the use position;
   a track having a base adapted to be fixedly secured to the platform, the track having upper and lower flanges protruding generally orthogonally from opposite sides of the base; and
   a channel adapted to be fixedly secured to the vehicle, the channel being slidably coupled to the track to allow selective movement of the platform between a storage position, wherein the upper surface is disposed substantially underneath the vehicle and a use position wherein the upper surface is disposed alongside the vehicle for ingress and egress thereon.

2. A deck as set forth in claim 1, wherein the channel includes an upper slot and a lower slot, wherein the upper slot is slidably engaged with the upper flange of the track and the lower slot is slidably engaged with the lower flange of the track to allow selective sliding movement of the platform relative to the frame of the vehicle between the storage and use positions.

3. A deck as set forth in claim 2, wherein the slider assembly includes a bracket adapted to fixedly interconnect the channel and the frame of the vehicle.

4. A deck as set forth in claim 3, wherein the bracket includes upper and lower faces adapted to be fixedly secured to the channel and the frame of the vehicle.

5. A deck as set forth in claim 4, wherein the attachment assembly also includes a mounting strap for fixedly interconnecting the bracket and the frame of the vehicle.

6. A deck as set forth in claim 5, wherein the mounting strap includes a front flange, a rear flange, and an end extending therebetween, the end adapted to be fixedly secured to the upper face of the bracket.

7. A deck as set forth in claim 6, wherein a slot is defined between the front flange and the rear flange for receiving the frame of the vehicle therein, the front and rear flanges being adapted to be fixedly secured to the frame while disposed in the slot of the mounting strap.

8. A deck as set forth in claim 7, wherein the channel is fixedly secured to the lower face of the bracket.

9. A deck as set forth in claim 1 including a step for facilitating ingress and egress from the upper surface of the platform.

10. A deck as set forth in claim 9, wherein the step is selectively collapsible for storage when the step is not in use.

11. A deck as set forth in claim 1 including at least one light source detachably mounted about the perimeter of the platform.

12. A deck as set forth in claim 1 including a fence detachably coupled to the platform.

13. A deck as set forth in claim 1 including a screen detachably coupled to the platform.

14. A deck for use with a vehicle having a frame, the deck comprising:
    a platform having opposite upper and lower surfaces, the platform being operatively coupled to the frame of the vehicle for selective movement between a storage position, wherein the upper surface is disposed substantially underneath the vehicle and a use position wherein the upper surface is disposed alongside the vehicle for ingress and egress thereon;
    a stabilizer extending downwardly from the platform for supporting the platform above the ground while in the use position, the stabilizer being selectively height adjustable to maintain the upper surface in a generally horizontal position;
    a threaded positioner mechanism disposed between the platform and the frame of the vehicle for selectively and automatically displacing the platform between the storage and use positions in response to a user input, the threaded positioner mechanism being driven by the reversible motor.

15. A deck as set forth in claim 14 wherein the threaded positioner mechanism includes a nut fixedly secured to the platform and a threaded rod rotatably driven by the reversible motor, the threaded rod being threadingly engaged with the nut such that the platform is driven between the storage and use positions in response to corresponding rotation of the threaded rod.

16. A vehicle comprising:
    a frame; and
    a platform having an upper surface;
    a stabilizer extending downwardly from the platform for supporting the platform above the ground while in the use position;
    a track having a base adapted to be fixedly secured to the platform, the track having upper and lower flanges protruding generally orthogonally from opposite sides of the base; and
    a channel adapted to be fixedly secured to the vehicle, the channel being slidably coupled to the track to allow selective movement of the platform between a storage position, wherein the upper surface is disposed substantially underneath the vehicle and a use position wherein the upper surface is disposed alongside the vehicle for ingress and egress thereon.

17. A vehicle as set forth in claim 16, wherein the channel includes an upper slot and a lower slot, wherein the upper slot is slidably engaged with the upper flange of the track and the lower slot is slidably engaged with the lower flange of the track to allow selective sliding movement of the platform relative to the frame of the vehicle between the storage and use positions.

18. A vehicle as set forth in claim 17, wherein the slider assembly includes a bracket adapted to fixedly interconnect the channel and the frame of the vehicle.

19. A vehicle as set forth in claim 18, wherein the bracket includes upper and lower faces adapted to be fixedly secured to the channel and the frame of the vehicle.

20. A vehicle as set forth in claim 19, wherein the attachment assembly also includes a mounting strap for fixedly interconnecting the bracket and the frame of the vehicle.

21. A vehicle as set forth in claim 20, wherein the mounting strap includes a front flange, a rear flange, and an end extending therebetween, the end adapted to be fixedly secured to the upper face of the bracket.

22. A vehicle as set forth in claim 21, wherein a slot is defined between the front flange and the rear flange for receiving the frame of the vehicle therein, the front and rear flanges being adapted to be fixedly secured to the frame while disposed in the slot of the mounting strap.

23. A vehicle as set forth in claim 22, wherein the channel is fixedly secured to the lower face of the bracket.

24. A deck for use with a vehicle having a frame, the deck comprising:
a platform having opposite upper and lower surfaces extending between spaced apart side members, the side members each having opposite inner and outer surfaces;
a slide assembly operatively coupled between each of the side members and the frame of the vehicle for selective movement between a storage position, wherein the upper surface is disposed substantially underneath the vehicle and a use position wherein the upper surface is disposed alongside the vehicle for ingress and egress thereon, the slide assemblies being disposed along the inner surface of each side member for concealing and protecting the slide assembly during movement of the platform between the use and storage positions.

* * * * *